United States Patent
Yeh et al.

(10) Patent No.: US 10,282,106 B2
(45) Date of Patent: May 7, 2019

(54) DATA STORAGE DEVICE AND OPERATING METHOD OF MEMORY CONTROLLER

(71) Applicant: Silicon Motion, Inc., Jhubei, Hsinchu (TW)

(72) Inventors: Yen-Ting Yeh, Taoyuan (TW); Teng-Chi Liang, Hsinchu (TW)

(73) Assignee: SILICON MOTION, INC., Jhubei, Hsinchu (TW)

( * ) Notice: Subject to any disclaimer, the term of this patent is extended or adjusted under 35 U.S.C. 154(b) by 40 days.

(21) Appl. No.: 15/438,773

(22) Filed: Feb. 22, 2017

(65) Prior Publication Data

US 2017/0269836 A1 Sep. 21, 2017

(30) Foreign Application Priority Data

Mar. 18, 2016 (TW) .............................. 105108490 A

(51) Int. Cl.
*G06F 3/06* (2006.01)

(52) U.S. Cl.
CPC .............. *G06F 3/061* (2013.01); *G06F 3/065* (2013.01); *G06F 3/0653* (2013.01); *G06F 3/0685* (2013.01)

(58) Field of Classification Search
CPC .................. G06F 3/00; G06F 3/06–061; G06F 3/0611–065; G06F 3/0652–0653; G06F 3/0655–0685; G06F 3/0686–0689; G06F 11/00–3696; G06F 12/00–16; G06F 13/00–4295; G06F 17/30–30997; G06F 2003/0691–0698; G06F 2206/00–20;
(Continued)

(56) References Cited

U.S. PATENT DOCUMENTS 5,381,539 A * 1/1995 Yanai .................. G06F 12/0862
711/129
8,719,652 B2 * 5/2014 Mataya ............... G06F 12/0866
714/718
(Continued)

FOREIGN PATENT DOCUMENTS

CN 105095116 11/2015
TW 200937422 9/2009

OTHER PUBLICATIONS

Definition cache (computing); Rouse, Margaret; Apr. 2015; retrieved from https://searchstorage.techtarget.com/definition/cache on May 29, 2018 (Year: 2015).*
(Continued)

*Primary Examiner* — Daniel C. Chappell
(74) *Attorney, Agent, or Firm* — WPAT, PC

(57) ABSTRACT

An operating method of a memory controller includes steps of: configuring the memory controller to receive a read command and read at least one piece of first data stored in a non-volatile memory according to the received read command; configuring the memory controller to determine whether a read count of the at least one piece of first data is greater than a set value; and configuring the memory controller to copy and store the at least one piece of first data in a data temporary storage device when the read count of the at least one piece of first data is determined to be greater than the set value. A data storage device and another operating method are also provided.

14 Claims, 3 Drawing Sheets

(58) Field of Classification Search
CPC ........ G06F 2212/00–7211; G06F 2213/00–40; G06F 2216/00–17
See application file for complete search history.

(56) References Cited

U.S. PATENT DOCUMENTS

| | | | | |
|---|---|---|---|---|
| 8,806,122 | B2* | 8/2014 | Benhase | G06F 12/0866 711/103 |
| 9,104,552 | B1* | 8/2015 | Bolt | G06F 12/0246 |
| 2010/0169708 | A1 | 7/2010 | Rudelic et al. | |
| 2014/0351498 | A1* | 11/2014 | Hsueh | G06F 12/0866 711/103 |
| 2016/0092372 | A1* | 3/2016 | Radinski | G06F 12/121 711/133 |
| 2017/0075812 | A1* | 3/2017 | Wu | G06F 12/0893 |
| 2017/0269834 | A1* | 9/2017 | Liang | G06F 3/061 |

OTHER PUBLICATIONS

A frequent-value based PRAM memory architecture; Sun et al.; 16th Asia and South Pacific Design Automation Conference; Jan. 25-28, 2011 (Year: 2011).*

Energy efficient thresholds for cached content in Content Centric Networking; Lafond et al.; 2013 24th Tyrrhenian International Workshop on Digital Communications—Green ICT; Sep. 23-25, 2013 (Year: 2013).*

Energy efficient Frequent Value data Cache design; Yang et al.; 35th Annual IEEE/ACM International Symposium on Microarchitecture; Nov. 18-22, 2002 (Year: 2002).*

DuraCache: a durable SSD cache using MLC NAND flash; Liu et al.; Proceedings of the 50th Annual Design Automation Conference, Article No. 166; May 29, 2013-Jun. 7, 2013 (Year: 2013).*

* cited by examiner

DATA STORAGE DEVICE AND OPERATING METHOD OF MEMORY CONTROLLER

FIELD OF THE INVENTION

The present invention relates to a data storage device and an operating method of memory controller, and more particularly to a data storage device and an operating method of memory controller capable of reducing a read count of a non-volatile memory.

BACKGROUND OF THE INVENTION

Non-volatile memory is an electronic memory device capable of maintaining information and performing fast data access without any additional power and having shockproof features. Therefore, non-volatile memory is extensively used in memory cards, solid state drives (SSD) and portable multimedia devices. When stored data has been read repeatedly, read disturbance of the non-volatile memory and incorrect storage of data may occur, and refresh of the non-volatile memory would become necessary at such point. However, frequent refresh may affect the lifetime of the non-volatile memory.

SUMMARY OF THE INVENTION

Therefore, one objective of the present invention is to provide a data storage device with non-volatile memory and an operating method of memory controller, so as to extend the operation life of the non-volatile memory.

The present invention provides an operating method of a memory controller. The method includes the steps of: configuring the memory controller to receive a read command and read at least one piece of first data stored in a non-volatile memory according to the received read command; configuring the memory controller to determine whether a read count of the at least one piece of first data is greater than a set value; and configuring the memory controller to copy and store the at least one piece of first data into a data temporary storage device when the read count of the at least one piece of first data is determined to be greater than the set value.

The present invention further provides a data storage device, which includes a non-volatile memory, a data temporary storage device and a memory controller. The non-volatile memory is configured to store a plurality of pieces of first data. The memory controller is electrically coupled to the non-volatile memory and the data temporary storage device. The memory controller is configured to receive a read command and read at least one piece of first data stored in the non-volatile memory according to the received read command. When a read count of the at least one piece of first data is greater than a set value, the memory controller is further configured to copy and store the at least one piece of first data into the data temporary storage device.

The present invention still further provides an operating method of a memory controller. The method includes the steps of: obtaining an address from a read command from a host; determining whether a read count shall be increased based on the address; determining whether the increased read count is greater than a default value; accessing a memory device controlled by the memory controller according to the address to obtain a data and output the data to the host if the increased read count is greater than the default value, wherein the data is stored into another memory device as well.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
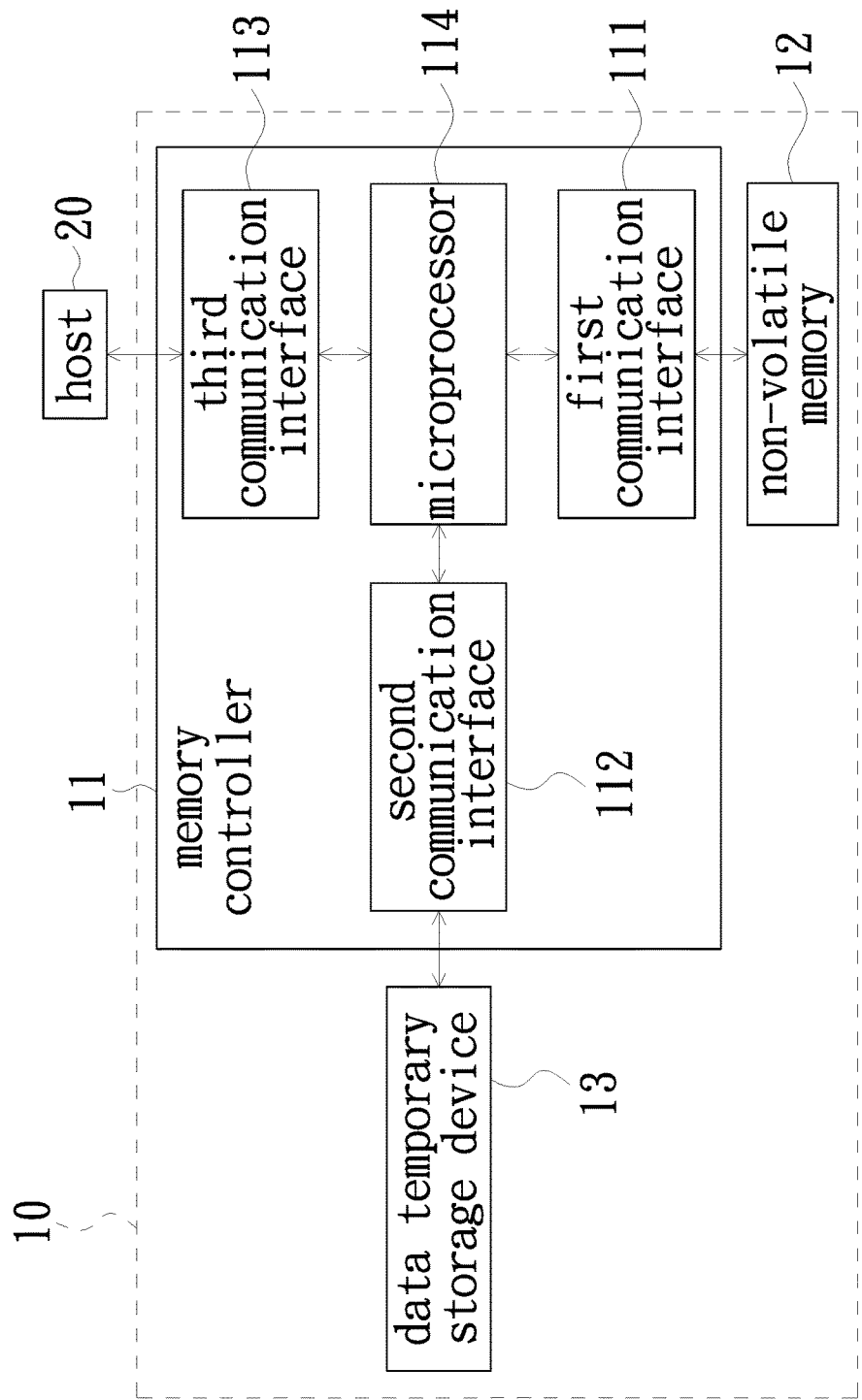
FIG. 1 is a schematic block view of a data storage device in accordance with an embodiment of the present invention.

Referring to FIG. 1, which is a schematic block view of a data storage device in accordance with an embodiment of the present invention. As shown in FIG. 1, the data storage device 10 of the present embodiment is configured to be in communication with an external host 20 and read the data stored in the data storage device 10 according to a read command issued from the host 20. In one embodiment, the aforementioned data may be display data or audio data, etc; and the host 20 may be an electronic device such as a desktop or a tablet computer. As shown in FIG. 1, the data storage device 10 of the present embodiment includes a memory controller 11, a non-volatile memory 12 and a data temporary storage device 13. The non-volatile memory 12 may be a flash memory and the data temporary storage device 13 may be a dynamic random access memory (DRAM). The memory controller 11 is electrically coupled to the host 20, the non-volatile memory 12 and the data temporary storage device 13. The memory controller 11 includes a first communication interface 111, a second communication interface 112, a third communication interface 113 and a microprocessor 114. The microprocessor 114 is electrically coupled to the first communication interface 111, the second communication interface 112 and the third communication interface 113. Via the first communication interface 111, the memory controller 11 is able to communicate with and accesses the non-volatile memory 12; via the second communication interface 112, the memory controller 11 is able to communicate with and accesses the data temporary storage device 13; and via the third communication interface 113, the memory controller 11 is able to communicate with the host 20. The non-volatile memory 12 includes a plurality of blocks (not shown), and each block includes a plurality of pages (not shown). The pages are used to store data and read counts of the corresponding pieces of data. In the present embodiment, specifically, the read count refers to the number of times of the data stored in the non-volatile memory 12 accessed by the microprocessor 114; and the microprocessor 114 performs data access on the non-volatile memory 12 in the data pages. In the present embodiment, the first communication interface 111 may be compliance with Open NAND Flash Interface (ONFI) or Toggle; the second communication interface 112 may be compliance with DDR PHY Interface (DFI); the third communication interface 113 may be compliance with Serial Advanced Technology Attachment (SATA) Interface, Universal Serial Bus (USB), Peripheral Component Interconnect Express (PCI Express), Non-Volatile Memory Express (NVMe), Universal Flash Storage (UFS), embeded Multi-Media Card (eMMC) and Secure Digital Input/Output (SDIO) Interface.

Figure 2:
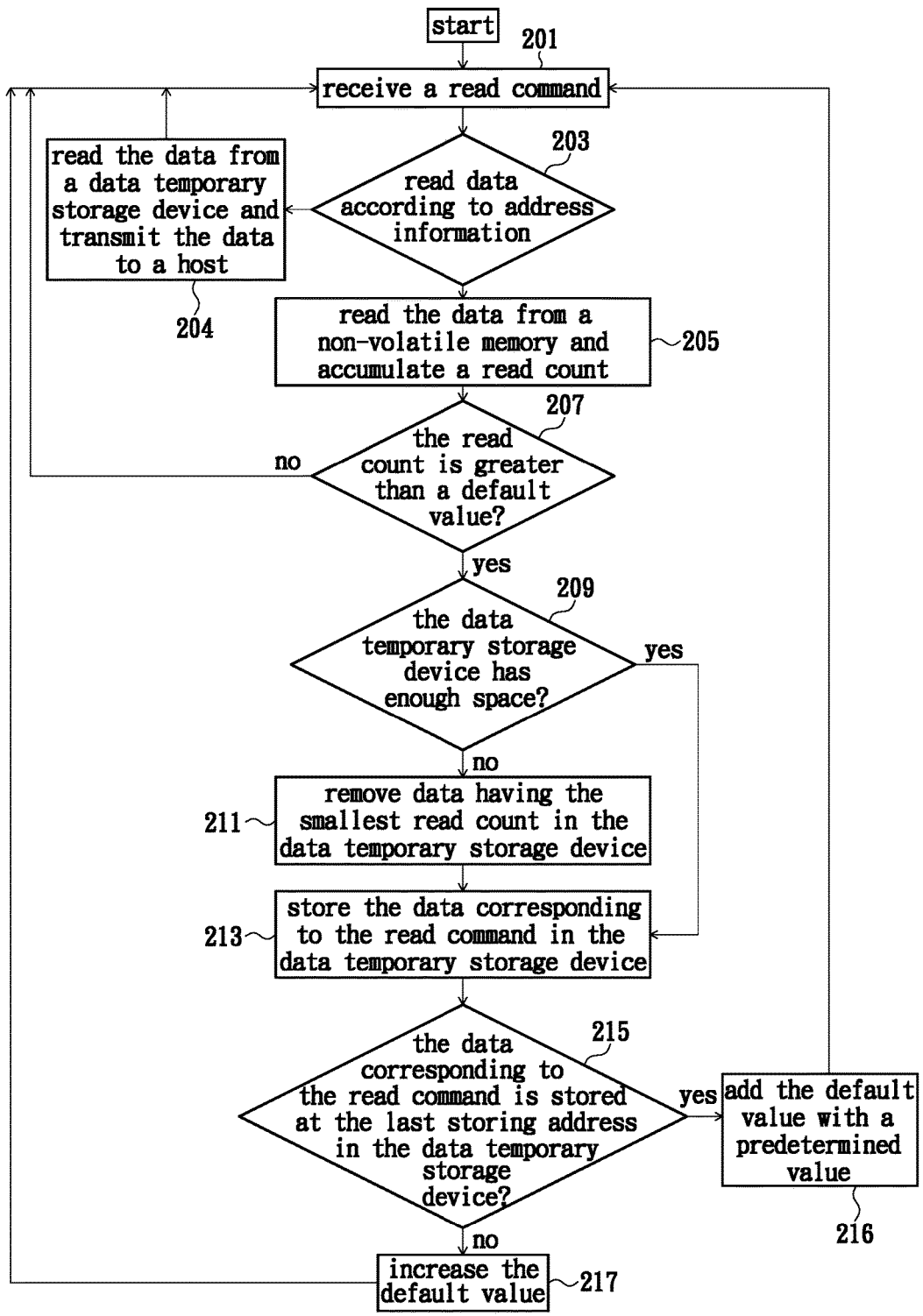
FIG. 2 is a flowchart of an operating method of the data storage device shown in FIG. 1 in accordance with an embodiment of the present invention.

FIG. 2 is a flowchart of an operating method of the data storage device shown in FIG. 1 in accordance with an embodiment of the present invention. Please refer to FIG. 1 and FIG. 2 together.

First, when reading a specific data stored in the data storage device 10 is required, the host 20 issues a read command to the data storage device 10; and correspondingly, the microprocessor 114 of the data storage device 10 receives the read command from the host 20 via the third communication interface 113 (step 201). Then, after receiving the read command, the microprocessor 114 obtains the storing address of the specific data according to the address information contained in the read command and reads the specific data (hereunder, data D1) corresponding to the storing address either from the non-volatile memory 12 or the data temporary storage device 13 (step 203). If the data D1 is already stored in the data temporary storage device 13, the microprocessor 114 directly reads the data D1 from the data temporary storage device 13 and transmits the data D1 to the host 20 via the third communication interface 113 (step 204), and consequently the step 201 is executed. Alternatively, if the data D1 is yet stored in the data temporary storage device 13, the microprocessor 114 reads the data D1 from the non-volatile memory 12 and transmits the data D1 to the host 20 via the third communication interface 113. Besides reading and transmitting the data D1, the microprocessor 114 further records the read count of the storing address of the data D1; that is, the microprocessor 114 updates the read count (such as incrementing the read count by one, but the present invention is not limited thereto) each time when the data D1 of the storing address is being read (step 205).

Then, the microprocessor 114 determines that whether the updated read count satisfies a predetermined condition, such as whether the read count is greater than a default value (step 207). For example, if the default value is 50, the predetermined condition would be satisfied when the read count is greater than 50. If the determination result obtained in the step 207 is false, the step 201 is executed; that is, if it is determined that the read count of the data D1 is smaller than or equal to the default value, the microprocessor 114 continues to read the data D1 from the non-volatile memory 12 and transmits the data D1 to the host 20 via the third communication interface 113. Alternatively, if the determination result obtained in the step 207 is true (that is, the read count of the data D1 is greater than the set value) which indicates that the data D1 is frequently read, the microprocessor 114 copies and stories the data D1 into the data temporary storage device 13. That is, in addition to being stored in the non-volatile memory 12, the data D1 is also stored in the data temporary storage device 13. Therefore, next time when the host 20 requests to read the data D1, the microprocessor 114 reads the data D1 from the data temporary storage device 13 instead of from the non-volatile memory 12.

In one embodiment, a time parameter may be introduced in the step 207; that is, the default value increases for a certain period and dropped down back to the original value after the period. For example, the set value may increase from 50 to 60 at the $30^{th}$ second and then dropped down from 60 to 50 at the $60^{th}$ second. In another embodiment, the default value may directly set to a maximum value (the maximum value may be 1024 if the length of the default value is 10 bits) at the $30^{th}$ second, so that the determination result obtained in the step 207 is always false during the period from $30^{th}$ to $60^{th}$ seconds; and then the default value is set to 50 at the $60^{th}$ second. In still another embodiment, the increment of the default value may stop at the $30^{th}$ second, so that the determination result obtained in the step 207 is always false during the period from $30^{th}$ to $60^{th}$ seconds; and then the default value is reset to 0 at the $60^{th}$ second.

In another embodiment, a threshold may be introduced in the step 207. For example, the default value is dropped down from 60 to 50 when the read count of the data is greater than the threshold (e.g., 100), so that the determination performed in the step 207 is more practical. It is understood that the adjustment of the default value can be based on the aforementioned read count, time parameter, threshold, or the combination thereof; and the present invention is not limited thereto.

Figure 3A:
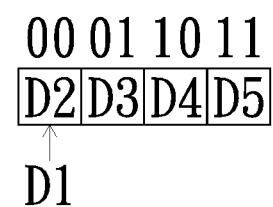
FIG. 3A is a schematic view illustrating data storage of a data temporary storage device in accordance with an embodiment of the present invention.
Figure 3B:
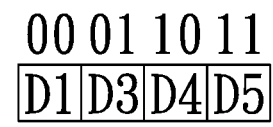
FIG. 3B is another schematic view illustrating data storage of a data temporary storage device in accordance with an embodiment of the present invention.

Please continue to refer to FIG. 1 and FIG. 2. When the microprocessor 114 requests to copy and store the data D1 in the data temporary storage device 13, the microprocessor 114 first determines whether the data temporary storage device 13 has enough space to store the data D1 (step 209). For example, as illustrated in FIG. 3A, in the case where the data temporary storage device 13 can store four pieces of data, when the determination result obtained in the step 209 is false, which indicates that the data temporary storage device 13 currently does not have enough space for the data D1, the microprocessor 114 would logically remove the data having the smallest read count from the data temporary storage device 13 (step 211). For example, as illustrated in FIG. 3A, the data temporary storage device 13 has stored data D2, data D3, data D4 and data D5. The read count of the data D2 is 51; the read count of the data D3 is 52; the read count of the data D4 is 53; and the read count of the data D5 is 54. Therefore, in order to store the data D1 into the current data temporary storage device 13, the microprocessor 114 would logically remove the data D2 having the smallest read count from the data temporary storage device 13 so as to make enough space for the data temporary storage device 13 for storing the data D1. As illustrated in FIG. 3B, the data D1 is stored in the space where the data D2 was previously stored; and consequently, the microprocessor 114 updates the storing address of the data D2 from the current data temporary storage device 13 to the non-volatile memory 12 and the read count of the data D2 would increment when the data D2 is being read. Specifically, once the data D2 is to be read thereafter, the microprocessor 114 would read the data D2 from the non-volatile memory 12 according to the storing address thereof and increment the read count of the data D2.

Please continue to refer to FIG. 1 and FIG. 2. When the determination result obtained in the step 209 is true or the step 211 is completed, meaning that the data temporary storage device 13 currently has enough space for the data D1, the microprocessor 114 would not only transmit the data D1 to the host 20 but also copy and store the data D1 into the data temporary storage device 13 (step 213). Consequently, the microprocessor 114 updates the storing address of the data D1 from the non-volatile memory 12 to the data temporary storage device 13. Because the data D1 is also stored in the data temporary storage device 13, the microprocessor 114 would directly read the data D1 from the data temporary storage device 13 according to the storing address thereof once the read command corresponding to the data D1 is received from the host 20 (that is, the step 204); and accordingly the microprocessor 114 stops incrementing the read count of the data D1 stored in the data temporary storage device 13.

In order to avoid storing data into the data temporary storage device 13 too frequently, the microprocessor 114 may first determine whether another predetermined condition is satisfied; that is, the microprocessor 114 would determine whether all the storing addresses in the data temporary storage device 13 are stored with data (step 215). In one embodiment, specifically, the aforementioned determination may be obtained based on whether the data D1 is stored at the last storing address of the data temporary storage device 13. For example, the determination result obtained in the step 215 would be true if the storing addresses 00, 01, 10 and 11 of the data temporary storage device 13 are all stored with data and the data D1 in the step 213 is stored at the storing address 11, which is the last storing address of the data temporary storage device 13. If the determination result obtained in the step 215 is true, the microprocessor 114 updates the default value such as adding the default value with a predetermined value (step 216). In one embodiment, the predetermined value is 50, but the present invention is not limited thereto. If the predetermined value is 50, the default value is updated from 50 to 100; and accordingly, the microprocessor 114 would copy and store specific data in the data temporary storage device 13 only when the read count of the specific data is greater than 100. The step 201 is executed to wait for the next read command once the step 216 is completed. Alternatively, if the determination result obtained in the step 215 is false, which indicates that the data D1 is not stored at the last storing address of the data temporary storage device 13, the microprocessor 114 would increase the default value (step 217). In one embodiment, the microprocessor 114 adds the default value by 1, but the present invention is not limited thereto. For example, if the default value is updated from 50 to 51, the microprocessor 114 would copy and store specific data in the data temporary storage device 13 only when the read count of the specific data is greater than 51. By increasing the default value each time when a piece of data is stored, the situation in which a plurality of pieces of data have read counts greater than a default value at the same time could be prevented, and consequently the microprocessor 114 continuously performing data saving for a period is avoided. The step 201 is executed to wait for the next read command once the step 217 is completed.

In summary, because the data storage device 10 of the present invention is capable of copying and storing the data having a relatively large read count in the data temporary storage device 13, the data temporary storage device 13 is able to cover the read frequency of the non-volatile memory 12 significantly; therefore, read count and read disturbance of the non-volatile memory 12 are effectively reduced and lifetime and performance of the non-volatile memory 12 are effectively increased. Further, because the data temporary storage device 13 can be implemented by any existing storage device in the data storage device 10, the aforementioned objective can be achieved without any additional storage device or space; and consequently the data storage device of the present invention has reduced cost and improved commercial value.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An operating method executed by a memory controller, comprising steps of:
   receiving a read command at the memory controller for reading a first data in a non-volatile memory;
   increasing a read count of the first data and thereafter determining whether the read count of the first data is greater than a set value;
   copying the first data from the non-volatile memory into a data temporary storage device when the read count of the first data is determined to be greater than the set value, and increasing the set value immediately thereafter, wherein step of copying the first data from the non-volatile memory into a data temporary storage device, further comprising: determining whether the first data is stored at a last storing address of the data temporary storage device; and increasing the set value with a first value if the first data is stored at the last storing address of the data temporary storage device, otherwise increasing the set value with a second value, where the first value is different from the second value.

2. The operating method executed by a memory controller according to claim 1, further comprising a step of:
   accessing the first data stored in the data temporary storage device according to the read command when the memory controller receives the read command corresponding to the first data.

3. The operating method of executed by a memory controller according to claim 1, wherein the step of copying the first data into the data temporary storage device, further comprises:
   determining, whether the data temporary storage device has a space sufficient for storing the first data; and
   removing a second data stored in the data temporary storage device when the data temporary storage device is determined not to have the space sufficient for storing the first data, wherein a read count of the second data is smaller than the read count of the first data.

4. The operating method executed by a memory controller according to claim 1, wherein the non-volatile memory comprises a plurality of blocks, each of the plurality of blocks comprises a plurality of data pages, and the first data is stored in the data pages.

5. The operating method executed by a memory controller according to claim 1, wherein the first value is larger than the second value.

6. The operating method executed by a memory controller according to claim 1, wherein step of copying the first data from the non-volatile memory into a data temporary storage device, further comprising:
   determining whether the data temporary storage device has enough space; and
   removing data having a smallest read count in the data temporary storage device if the data temporary storage device does not have enough space.

7. A data storage device, comprising:
   a non-volatile memory, storing a plurality of pieces of first data;

a data temporary storage device; and a memory controller, electrically coupled to the non-volatile memory and the data temporary storage device, wherein the memory controller receives a read command to access a first data stored in the non-volatile memory and to increase a read count of the first data when a read count of the first data is greater than a set value, the memory controller copies the first data into the data temporary storage device and immediately thereafter increase the set value, wherein step of copying the first data from the non-volatile memory into a data temporary storage device, further comprising: determining whether the first data is stored at a last storing address of the data temporary storage device; and increasing the set value with a first value if the first data is stored at the last storing address of the data temporary storage device, otherwise increasing the set value with a second value, where the first value is different from the second value.

8. The data storage device according to claim 7, wherein when receiving the read command corresponding to the first data, the memory controller further reads the first data stored in the data temporary storage device.

9. The data storage device according to claim 7, wherein the memory controller further determines whether the data temporary storage device has a space sufficient for storing the first data, and to remove a second data stored in the data temporary storage device when the data temporary storage device is determined not to have the space sufficient for storing the first data, wherein a read count of the second data is smaller than the read count of the first data.

10. The data storage device according to claim 7, wherein the non-volatile memory comprises a plurality of blocks, each of the plurality of blocks comprises a plurality of data pages, and the first data is stored in the data pages.

11. An operating method of a memory controller, comprising steps of:

obtaining an address from a read command from a host;

determining whether a read count shall be increased based on the address;

determining whether the increased read count is greater than a set value;

accessing a memory device controlled by the memory controller according to the address to obtain a data and output the data to the host if the increased read count is greater than the set value, wherein the data is stored into another memory device as well; and increasing the set value, wherein step of storing the data into another memory device as well, further comprising: determining whether the data is stored at a last storing address of the another memory device; and increasing the set value with a first value if the data is stored at the last storing address of the another memory device, otherwise increasing the set value with a second value, wherein the first value is different from the second value.

12. The operating method of a memory controller according to claim 11, wherein the default value varies by a time parameter.

13. The operating method of a memory controller according to claim 11, wherein the default value is set to a maximum value after a default period.

14. The operating method of a memory controller according to claim 11, wherein the memory device is a flash memory and the other memory device is a dynamic random access memory.

* * * * *